United States Patent [19]
Camardella

[11] 3,993,803
[45] Nov. 23, 1976

[54] METHOD OF TINNING COIL TERMINALS

[76] Inventor: Giuseppe Camardella, Viale della Liberta, 118, 20031 Cesano Maderno, Milan, Italy

[22] Filed: Oct. 29, 1975

[21] Appl. No.: 626,844

Related U.S. Application Data

[63] Continuation of Ser. No. 519,295, Oct. 30, 1974, abandoned, which is a continuation of Ser. No. 299,166, Oct. 19, 1972, abandoned.

[52] U.S. Cl. .............................. 427/117; 118/120; 427/287; 427/433; 427/434 D
[51] Int. Cl.² ........................................ C23C 1/04
[58] Field of Search ............... 427/431, 433, 434 D, 427/434 E, 436, 117, 123, 287; 118/420, 423, DIG. 19; 29/1 NQ

[56] References Cited
UNITED STATES PATENTS

| | | | |
|---|---|---|---|
| 131,680 | 9/1872 | Hill | 427/433 X |
| 1,252,363 | 1/1918 | Roberts | 427/433 X |
| 2,216,519 | 10/1940 | Quarnstrom | 427/431 X |
| 2,294,750 | 9/1942 | Harris | 427/433 X |
| 2,354,459 | 7/1944 | Harris et al. | 118/DIG. 19 |
| 3,385,259 | 5/1968 | Orban et al. | 118/420 X |

*Primary Examiner*—Morris Kaplan
*Attorney, Agent, or Firm*—Stevens, Davis, Miller & Mosher

[57] ABSTRACT

Method and apparatus for tinning spaced portions of a wire to comprise coil terminals.

Means feed the wire along a horizontal path, through a pivotally mounted and effectively closed member and above a tinning pot.

Wire feed is stopped and means pivot one end of said member into the pot whereby the wire section pouring through said end is tinned. Means pivot said member and wire to the horizontal position while advancing the wire a predetermined length equal to the contemplated coil. Feed is stopped and the means repeat the steps of immersing and advancing.

1 Claim, 1 Drawing Figure

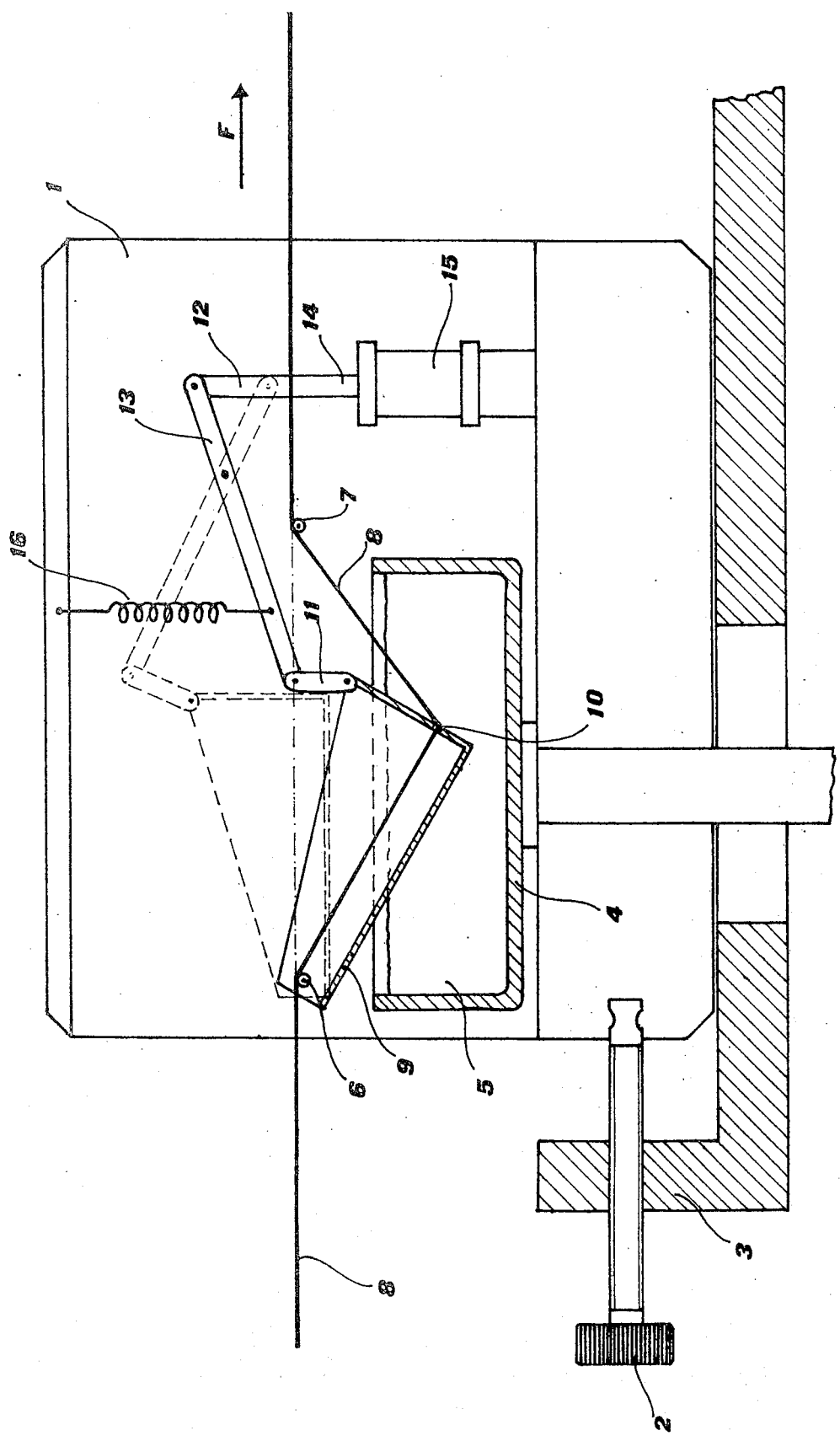

METHOD OF TINNING COIL TERMINALS

This is a continuation of application Ser. No. 519,295 filed Oct. 30, 1974, now abandoned, which in turn is a continuation of application Ser. No. 299,166, filed Oct. 19, 1972, now abandoned.

BACKGROUND OF THE INVENTION

1. Field of the Invention

It is known that in order to facilitate the connection of coils, and particularly of enameled copper wire coils, in electronic circuits, when manufacturing the coils themselves one provides to carry out the tinning of the terminals.

2. Description of the Prior Art

Two techniques are essentially provided for this purpose.

According to a first known system, the tinning of the terminals is carried out when the coil is already fully wound. In this case, the enameled copper terminals project tangentially from the coils and it is possible to immerge them into a melted tin bath; the temperature of the bath is such that it will destroy the enamel coating, thus allowing a perfect tinning.

It is however not always possible or appropriate to use this technique; if the terminals are very short, the immersion in the tin bath becomes in fact difficult, or even impossible if the tinning level is higher than the tangency to the coil body. In other cases, and particularly with terminals coming out tangentially in different directions, this tinning operation has to be carried out in two stages and thus becomes too long.

Another technique consists instead in carrying out the tinning along the copper wire coming from the feeding reel, and precisely in correspondence of positions which will then coincide with the position of the terminals, once the wire has been wound.

A known device allowing to carry out such tinning on a running length of copper wire, is based on the concept of letting the copper wire normally slide in close proximity of a melted tin bath, and then — in the position and at the moment of carrying out the tinning — causing a wave to be formed in said bath, which, upon rising, will lap the wire, thus carrying out the tinning thereof. Nonetheless, in general, this device does not provide sufficient reliability of work; moreover, the length of time in which the tin bath remains in contact with the wire is usually too short to surely destroy the enamel layer.

A further known device for carrying out this type of tinning comprises a rectilinear path of the copper wire over a melted tin bath, and a spoon normally immerged in said bath, said spoon — at the moment of the tinning — raising a small quantity of melted tin. The spoon has, on its opposed side walls, two slits which are sufficiently narrow to prevent the melted tin from coming out of said slits, thanks to a superficial tension effect. When the spoon is raised, filled with melted tin, the copper wire engages into said slits and is hence immerged in the melted tin; the tinning is then carried out over a wire length equal to the spoon width. Nonetheless, also this device has its own drawbacks: first of all, if one had to modify the length of tinned wire, it would be necessary to replace the spoon; moreover, since the wire is drawn out of the bath exactly in the same position in which it is immerged, it so happens that the scruff formed by the enamel having come off the wire easily falls back again onto the wire itself — as the latter comes out of the bath — and remains stuck thereon upon cooling of the tinning.

Finally, a rather serious drawback, common to the two above mentioned tinning devices, should further be mentioned. It happens in fact that, at the moment in which the melted tin mass, after having been brought into contact with the horizontal wire, abandons the latter at the end of the tinning stage — both in the event of the wire being abandoned rapidly (as in the tin-wave device), and in the event of the wire being abandoned more slowly (as in the aforementioned spoon device) — on the wire itself is formed, in a more or less central position, like a small tin drop. Upon cooling this drop forms a swell which provides two kinds of drawbacks: on the one hand, in fact, when the wire is fed to the wireguide of the coil winding machine, which has a minimum passage section, said swell may get caught into the wire-guide itself, eventually also causing the breaking of the wire; on the other hand, this swell is generally sufficient to prevent the correct insertion of the coil terminals into the holes of the printed circuits, on which the coil has to be mounted, said holes being in fact usually small.

SUMMARY OF THE INVENTION

The device to practice the present invention eliminates all these drawbacks, said device being of the type apt to carry out the tinning along a running length of feeding wire. Such device is actually characterized by the fact that it comprises means for guiding the feeding wire along at least a rectilinear length over the melted tin bath, and means for moving downward at least an intermediate portion of said rectilinear wire length up to immerging it in said melted tin bath.

In addition to its structural and functional simplicity, the device to practice the present invention achieves the important advantage of preventing any forming of tin drops. In fact, when said intermediate portion of copper wire is immerged into the melted tin bath, it takes a slanting position, so that, at its subsequent drawing out of the bath, the wire does not emerge simultaneously over all its length, but gradually, starting from its higher end. The melted tin may hence slide along the wire, as the latter emerges from the bath, and it has surprisingly been found that this circumstance is by all means sufficient to prevent any forming and subsequent solidifying of drops on the wire itself.

More particularly, such results are obtained due to the fact that, in the device to practice the present invention, said means for moving and immerging the wire comprise a trowel, hinged at an end on a fixed point and carrying at the other end guide means for the copper wire, said trowel being normally kept in a rest position in which the copper wire follows its normal rectilinear path, and being caused to oscillate towards and into the melted tin bath, at the moment of the tinning, so as to immerge in the bath at least a short length of wire.

BRIEF DESCRIPTION OF THE DRAWING

The invention is described with reference to an embodiment given by mere way of example and illustrated in a very schematic, partially sectioned side view, in the accompanying drawing.

DESCRIPTION OF THE PREFERRED EMBODIMENT

In the drawing, the tinning device is shown mounted on a truck 1, slidable and adjustable in position, by means of the screw 2, in respect of the frame 3 of the coil winding machine (not shown). This possibility of adjustment is necessary, as will be better pointed out hereinafter, and it is besides in compliance with the known technique.

On the truck 1 is rotatably mounted a crucible 4 containing a melted tin bath 5; this crucible may be for example of the type described in the Italian Patent No. 664471, in the name of the same applicant.

Over the bath 5 is provided at least a pair of guide means, for example consisting merely of a pair of pins 6 and 7, between which the copper wire 8, to be tinned, is normally kept rectilinear (see position indicated with dash-and-dot lines) while being fed to the coil winding machine.

On the same pin 6 is pivoted an end of the trowel 9, being provided, on the wall at its other end, with a hole 10 for letting through and guiding the wire 8.

The trowel 9 is further connected, through a system of connecting rods 11–12 and a lever 13, to the rod 14 of a jack 15.

The working takes place as follows. When the coil is being wound on the coil winding machine (not shown), the wire is fed according to the arrow F, and follows the rectilinear path between the guide means 6–7, passing through the hole 10 of the trowel 9 (which is in its raised position, of rest, shown with dashed lines).

When the coil winding machine stops, at the end of the winding of a coil, and a tinning operation has to be carried out along the wire length running between 6 and 7, the jack 15 is operated. The latter then causes the trowel 9 to oscillate clockwise, up to the position shown with continuous lines in the drawing; in this position, the trowel 9 is partially immerged in the bath 5, so that the length of wire 8 running from the hole 10 (being itself immerged) towards the pin 7, gets in turn at least partially immerged and hence tinned.

The length of tinned wire portion is that running between the hole 10 and the surface of the bath 5, on the side of pin 7, and may of course be regulated through adjustment of the 7, and degree of the trowel 9. The length of wire 8 which runs instead from the hole 10 backward in the direction of pin 6, remains protected by the dry concavity of the trowel 9 and undergoes no tinning; the free upper edge of the trowel 9 always remains in fact above the level of the bath 5, and on the other hand, the melted tin is prevented from passing through the hole 10, being very small, thanks to a superficial tension effect of the liquid tin.

When the coil winding machine is started again, the jack 15 is released and the trowel 9 is returned upward by the action of the spring 16.

The tinned length, downstream of the hole 10, comes to find itself, in the general arrangement of the machine, in such a position that, when a coil is finished in the coil winding machine, said tinned length forms exactly the terminal of the coil itself. To make sure that this condition will always correctly take place, the tinning unit is mounted, as said, on a truck support 1; the position of the truck 1 is then adjustable in respect of the coil winding machine, in such a way that the distance between the hole 10 and the terminal of a formed coil — measured along the path of the feeding wire — is equal to, or is a full multiple of, the length of wire forming a coil. Since this arrangement is fully similar to that used in the known machines of this type, it seems needless to have to go into further details as to the type of construction.

It is anyhow understood that the invention should not be considered as limited to the embodiment described, but that there may be many other different embodiments thereof, without thereby departing from the scope of the present invention.

I claim:

1. A process for tinning the terminals of a coil wire comprising guiding a wire from which the coil is made along a rectilinear horizontal path over a melted tin bath, stopping the forward advancement of the wire, deviating said stopped wire from said rectilinear horizontal path downwardly so that a predetermined length of said wire is positioned below the surface of said bath and a section of said predetermined length of said wire is in submerged contact with said melted tin bath, starting the advancement of the wire and simultaneously returning said predetermined length of wire to said rectilinear horizontal path and continuing the advancement of said wire along the rectilinear horizontal path a distance equal to the length of the coil before again stopping the forward advancement of the wire and repeating the immersion and advancing process at the termination of said distance.

* * * * *

UNITED STATES PATENT AND TRADEMARK OFFICE
CERTIFICATE OF CORRECTION

PATENT NO. : 3,993,803
DATED : November 23, 1976
INVENTOR(S) : Giuseppe CAMARDELLA It is certified that error appears in the above—identified patent and that said Letters Patent are hereby corrected as shown below:

Insert after line [21]

-- [30]  Foreign Application Priority Data --
      -- October 20, 1971  Germany........2152211.2 --

Signed and Sealed this

Twenty-first Day of June 1977

[SEAL]

Attest:

RUTH C. MASON
*Attesting Officer*

C. MARSHALL DANN
*Commissioner of Patents and Trademarks*